United States Patent [19]

Cornell et al.

[11] 4,014,078
[45] Mar. 29, 1977

[54] CLAMPING DEVICE WITH ADJUSTING RING

[75] Inventors: Paul V. Cornell, Amherst, Mass.; Paul A. Cornell, Knockanore, Ireland

[73] Assignee: Electro-Clamp Corporation, Beverly Hills, Calif.

[22] Filed: Jan. 16, 1976

[21] Appl. No.: 649,653

[52] U.S. Cl. .................. 24/132 R; 24/132 AB; 339/266 R
[51] Int. Cl.² ................................ F16G 11/00
[58] Field of Search .............. 339/266 R; 24/132 R, 24/132 LS, 132 AB, 132 AC, 134 R, 134 L, 132 AA; 403/395

[56] References Cited
UNITED STATES PATENTS

| 841,082 | 1/1907 | Freeman | 403/395 |
| 1,989,861 | 2/1935 | Hixon | 24/132 AA UX |
| 3,138,422 | 6/1964 | Lawlor | 339/266 R |
| 3,437,979 | 4/1969 | Beaudion | 24/132 R X |
| 3,801,952 | 4/1974 | Lawlor | 339/266 R |
| 3,883,211 | 5/1975 | Shugarman et al. | 339/266 R |

FOREIGN PATENTS OR APPLICATIONS

| 34,904 | 11/1970 | Japan | 339/266 R |

*Primary Examiner*—Donald A. Griffin
*Attorney, Agent, or Firm*—Robert L. Harmon

[57] ABSTRACT

An improved rotary jaw clamping device is disclosed for use with cables, wires and the like which includes means disposed between the rotating jaws of the clamp to adjust the cable-receiving and cable-clamping capability of the clamp to enable its use with cables of varying diameters.

7 Claims, 12 Drawing Figures

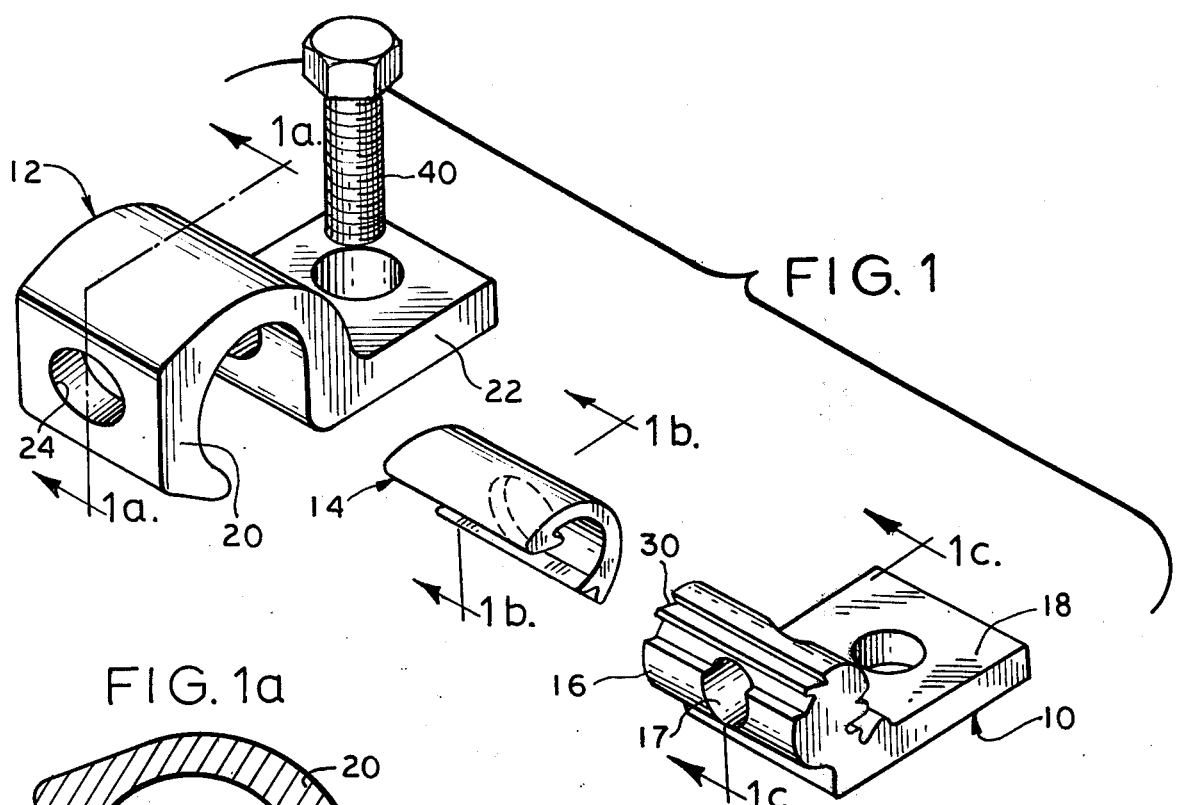
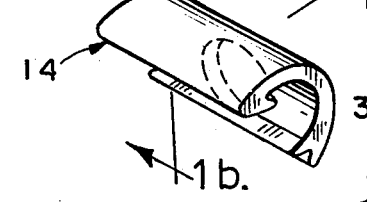
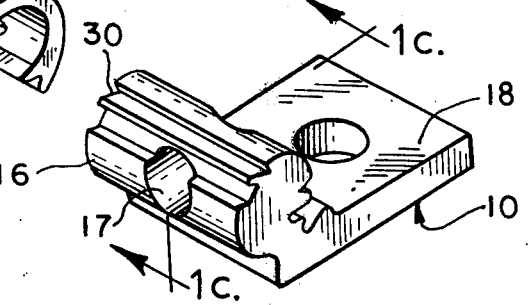
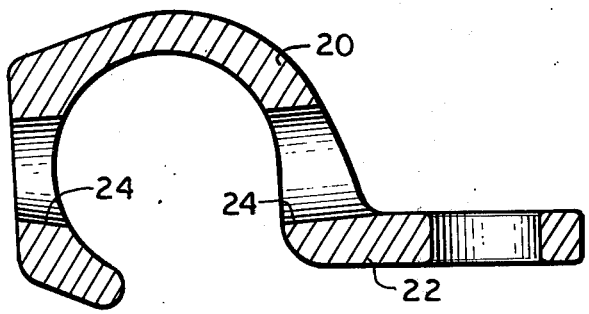
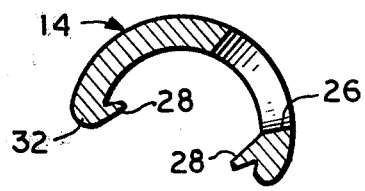
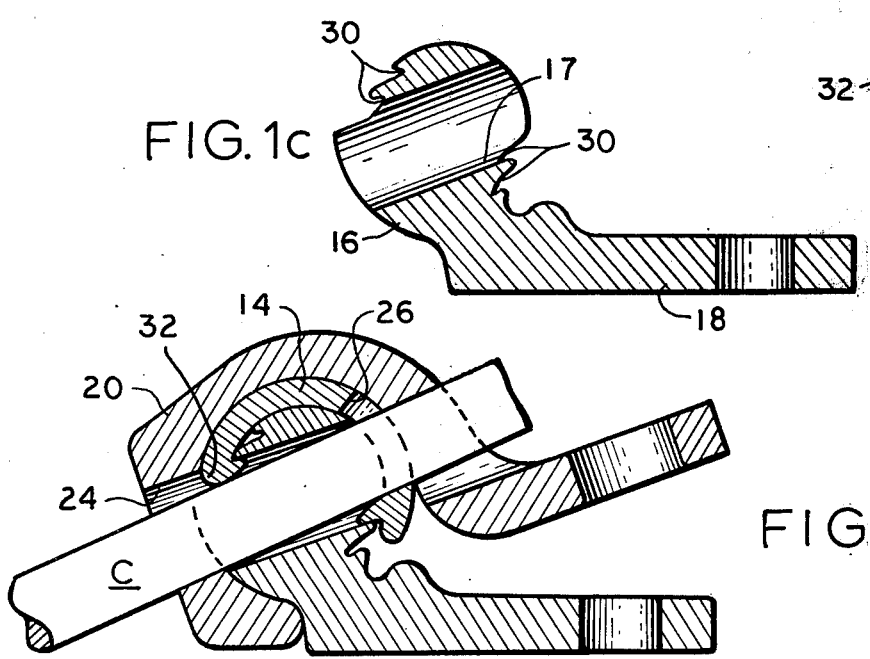

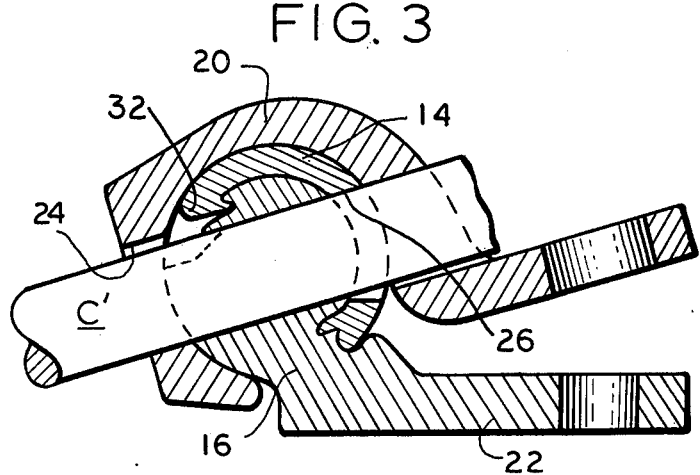
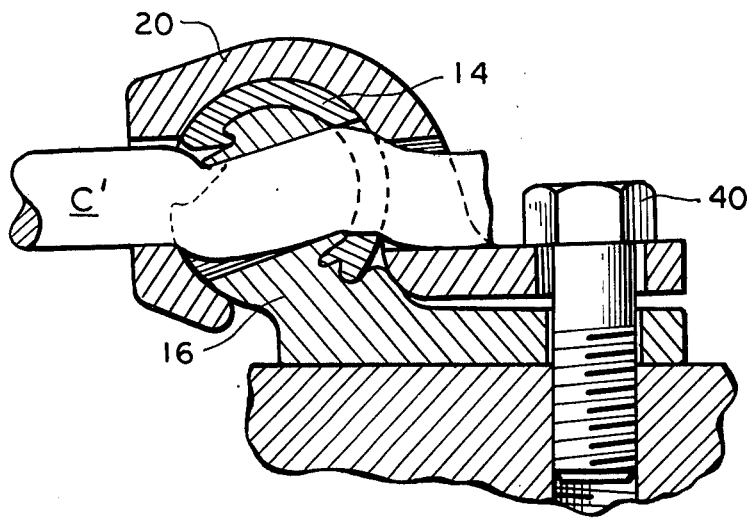
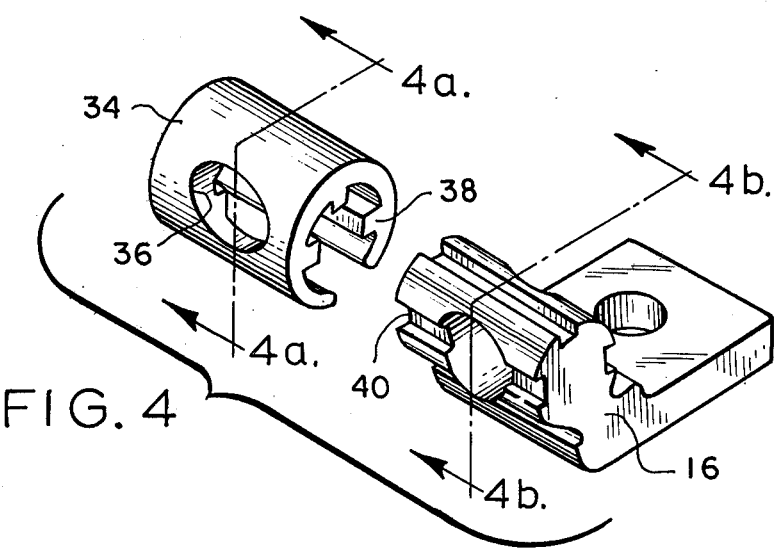

CLAMPING DEVICE WITH ADJUSTING RING

BACKGROUND AND SUMMARY OF THE INVENTION

The present invention relates, generally, to clamping devices for cables, wires and the like. More specifically, the invention relates to an improved cable clamp of the rotary jaw type which may be adjusted to accomodate cables of varying diameters.

Rotary jaw clamping devices are well known in the art and have met with success as terminal connectors both in electrical and non-electrical applications. One problem encountered in the use of prior art devices is that a specific size clamp is required for each size cable or wire. Thus, where a cable is replaced with one of a different diameter, the clamp should also be changed. Similarly, where a number of different sized cables are employed in a given installation, a like number of different sized clamps should be employed.

Accordingly, the present invention is directed to an improved rotary jaw cable clamp which employs means for adjusting the cable-receiving and cable-clamping capability thereof to enable the use of the device with cables of varying diameters.

BRIEF DESCRIPTION OF THE DRAWINGS

The novel features which are characteristic of the invention are set forth in the appended claims. The invention itself, however, together with further objects and attendant advantages thereof, may be best understood by reference to the following description taken in connection with the accompanying drawings in which:

FIG. 1 is an exploded perspective view illustrating one embodiment of the present invention;

FIGS. 1a, 1b and 1c are cross-sectional views taken along lines 1a—1a, 1b—1b, and 1c—1c, respectively, of FIG. 1;

FIG. 2 is a cross-sectional view showing the embodiment of FIG. 1 in the open position, receiving a cable of relatively small diameter;

FIG. 3 is a cross-sectional view showing the embodiment of FIG. 1 in the open position, receiving a cable of relatively large diameter;

FIG. 3a is a cross-sectional view of the embodiment of FIG. 1 in the closed position, clamping securely a cable of relatively large diameter;

FIG. 4 is an exploded perspective view illustrating another embodiment of the present invention;

DETAILED DESCRIPTION OF THE INVENTION

Figure 4A:
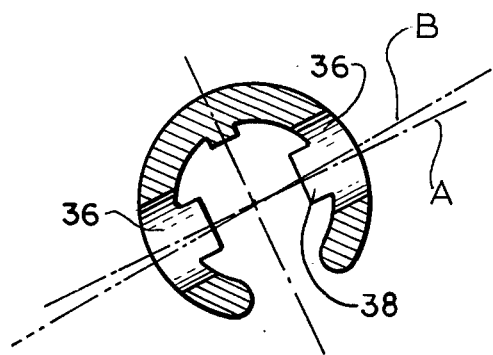
FIGS. 4a and 4b are cross-sectional views taken along lines 4a—4a and 4b—4b, respectively, of FIG. 4.

Referring to FIG. 1, the improved cable clamp of the present invention is illustrated in exploded relation. The clamp includes a male member 10, a female member 12 and adjusting ring 14. The male member 10 has a generally cylindrical head 16 having a transverse, cable-receiving bore 17 and a mounting tail 18 which extends from the head 16. The female member 12 has a sleeve 20 and a mounting tail 22 extending therefrom. The sleeve 20 also has a cable-receiving bore 24.

The male and female members rotationally engage in a manner well known in the art to move between open and closed positions. In the open position the male and female bores, 17 and 24, are in substantially linear alignment to receive the cable. In the closed position the bores, 17 and 24, are offset from one another to effect clamping forces on the cable.

In accordance with the present invention, the clamping device is provided with means for adjusting the cable-receiving and cable-clamping capability thereof. Generally, the adjusting means includes a ring disposed between the male head 16 and the female sleeve 20. The ring may be positioned in a number of attitudes to adjust the size of the cable-receiving and cable-clamping bore of the clamp. In this way one clamp can be utilized with a variety of cables having different diameters.

In the embodiment illustrated in FIGS. 1-3, the ring 14 has a cable-receiving bore 26 and at least one, and preferably two, axially extending ribs 28 which are adapted to engage the surface of the male head 16. The male head, in turn, has a plurality of axially extending grooves 30 which will mate with the ribs 28 of the ring 14, thereby preventing the rotational displacement of the ring when the clamping forces are developed through rotation of the female member 12.

The operation of this embodiment is clearly illustrated in FIGS. 2, 3, and 3a. In FIG. 2, the clamp is shown in the open position, receiving a cable C of relatively small diameter. In order to accomodate this small cable, the ring 14 is positioned at its extreme counter-clockwise position. In this position the forward edge 32 partially obstructs the forward opening of the male bore 17 and female bore 24. In addition, the ring bore 26 is positioned in only partial alignment with the rearward end of the male and female bores.

Similarly, in FIG. 3 the clamp is illustrated in the open position, receiving a cable C of relatively large diameter. Here the ring 14 has been moved to the extreme clockwise position such that the forward edge 32 thereof is displaced from the male head bore 17 and the ring bore 26 is fully aligned with the male head bore. In this position the maximum size cable may be utilized with the given clamp. It will be readily apparent to those skilled in the art that the number of axial grooves and ribs employed may be varied to meet the requirements of a specific application. Thus, while the present embodiment is shown with four grooves and two ribs for two ring positions, the invention is not intended to be so limited. Likewise, the size of the grooves 30 and ribs 28 have been somewhat exaggerated for purposes of illustration, and they may be much smaller in actual practice.

Figure 4B:
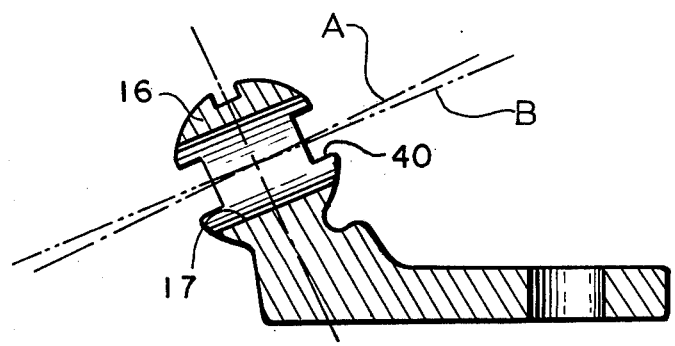
Figure 5:
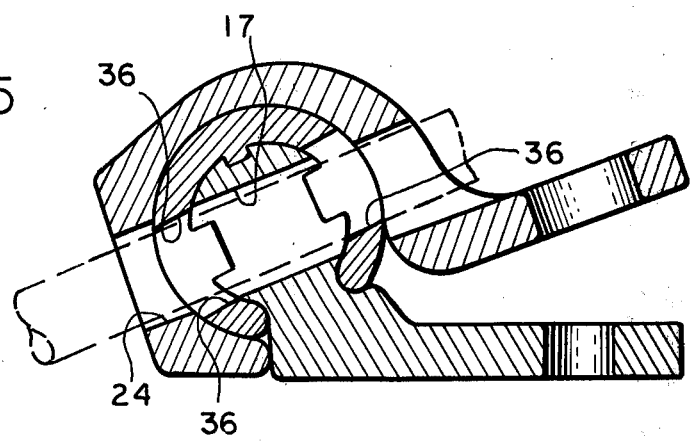
FIGS. 5 and 6 are cross-sectional views of the embodiment of the present invention shown in FIG. 4 in the open position, receiving cables of relatively small and relatively large diameters, respectively.
Figure 6:
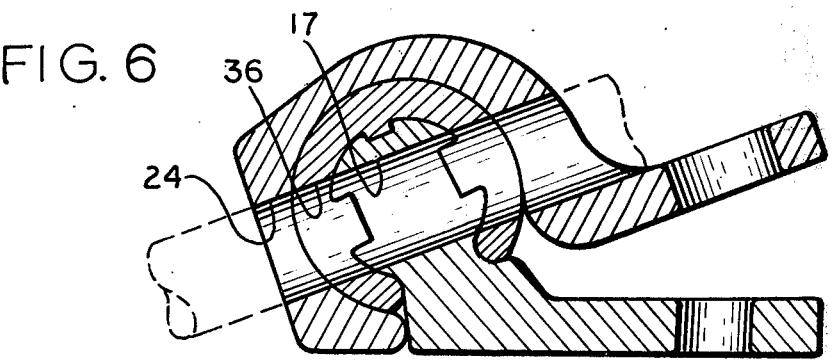

FIGS. 4-6 illustrate another embodiment of the present invention wherein a ring 34 may be mounted on the male head 16 in two different positions. In this embodiment the ring 34 occupies a greater portion of the circumference of the male head such that the ring bore passes through both sides thereof. In addition, the position of the ring 34 is changed by removing it from the male head and rotating it 180° such that its longitudinal ends are reversed on the clamp.

As is clearly seen in FIGS. 4a and 4b the axis of symetry A about which the ring 34 is mounted on the head 16 is slightly different from the axis B of the bores 36 and 17 in the ring and male head, respectively. Thus, when the ring 14 is mounted in the first mounting position, illustrated in FIG. 6, the bores of the male and female members and the ring 34 all are in substantial alignment. In this position the clamp can receive and secure a relatively large diameter cable.

The ring 34 may be removed from the head 16, rotated 180° and remounted on the head 16 in the second mounting position. In this position, as illustrated in FIG. 5, the bores 36 in the ring 34 are only in partial alignment with the male and female bores, 17 and 24, thereby adjusting the clamp to accomodate a somewhat smaller diameter cable.

The mounting of the ring 34 is accomplished by means of ribs 38 and grooves 40 and, of course, the ribs are positioned such that they will mate with the grooves 40 in either mounting position.

By using adjusting rings 34 having bores of different angular displacement, the male and female members of the same clamp can be used with a number of different sized cables.

It will also be appreciated by those skilled in the art that the individual components of this improved clamping device may be cast or extruded and may be constructed from a variety of materials, including metals and plastics. The means for securing and rotating the clamp to the closed position may vary for diffent applications and the bolt 40 shown in the drawings is merely for purposes of illustration.

Similarly, other changes and modifications to the preferred embodiments disclosed herein will be apparent to those skilled in the art without departing from the spirit of the invention and without lessening its attendant advantages. All such changes and modifications are, therefore, intended to fall within the scope of the following claims.

We claim:

1. A cable clamping device of the rotary jaw type comprising:
   a male member including a generally cylindrical head and a mounting tail extending therefrom, said male head having a transverse cable-receiving bore;
   a female member including a sleeve and a mounting tail extending therefrom, said sleeve having a cable-receiving bore;
   said female member adapted to receive said male head and to rotate thereon between open and closed positions, said male and female bores being generally aligned to receive a cable in said open position and offset to effect clamping forces on said cable in said closed position; and
   means disposed between said male head and said female sleeve for adjusting the cable-receiving and cable-clamping capability of said device to enable the use of said device with cables of varying diameters.

2. The cable clamping device of claim 1 wherein said adjusting means comprises a ring mounted on said male head, said ring having a cable-receiving bore and at least one axially extending rib on the internal surface thereof, said male head having a plurality of circumferentially spaced axially extending grooves adapted to receive said rib, whereby the alignment of said male head bore and said ring bore may be adjusted to accomodate cables of varying diameters.

3. The cable clamping device of claim 2 wherein said ring has a gnerally C-shaped configuration with a forward edge, said ring being positionable on said male head such that said forward edge may partially obstruct one end of said male head bore and said ring bore may partially obstruct the other end of said male head bore.

4. The cable clamping device of claim 1 wherein said adjusting means comprises a ring adapted to be mounted at a plurality of circumferential positions on one of said members, said ring having a cable-receiving bore and means for preventing rotational displacement of said ring relative to said one member, and said ring bore being at least partially aligned with said male and female bores at any one of said circumferential positions.

5. The cable clamping device of claim 4 wherein said ring is adapted to be mounted on said male head in first and second mounting positions, said ring bore being in complete alignment with said male head bore in said first position and in partial alignment with said male head bore in said second position.

6. In a cable clamping device of the rotary jaw type having male and female members which rotationally engage between open and closed positions and wherein said members have respective transverse bores which align to receive a cable in the open position and offset of effect clamping forces on said cable in the closed position, the improvement comprising:
   adjusting means disposed between said male and female members for adjusting the cable-receiving and cable-clamping capability of said device said adjusting means comprising a ring adapted for mounting at a plurality of circumferential positions on one of said members and having means to prevent the rotational displacement of said ring relative to said one member.

7. The improved cable-clamping device of claim 6 wherein said adjusting means comprises a generally C-shaped ring having a cable-receiving bore, said ring bore being at least partially aligned with said male and female bores at any one of said circumferential positions.

* * * * *